US 8,861,028 B2

(12) United States Patent
Suzuki

(10) Patent No.: US 8,861,028 B2
(45) Date of Patent: Oct. 14, 2014

(54) COLOR-ADJUSTING METHOD AND NON-TRANSITORY COMPUTER READABLE MEDIUM STORING COLOR-ADJUSTING PROGRAM

(71) Applicant: Konica Minolta, Inc., Tokyo (JP)

(72) Inventor: Naoyo Suzuki, Tokyo (JP)

(73) Assignee: Konica Minolta, Inc. (JP)

( * ) Notice: Subject to any disclaimer, the term of this patent is extended or adjusted under 35 U.S.C. 154(b) by 0 days.

(21) Appl. No.: 13/862,312

(22) Filed: Apr. 12, 2013

(65) Prior Publication Data

US 2013/0271779 A1  Oct. 17, 2013

(30) Foreign Application Priority Data

Apr. 16, 2012  (JP) ................. 2012-092548

(51) Int. Cl.
*H04N 1/60* (2006.01)

(52) U.S. Cl.
CPC ........... *H04N 1/6061* (2013.01); *H04N 1/6058* (2013.01)
USPC ............ 358/1.9; 358/518; 358/520; 382/162; 382/167

(58) Field of Classification Search
CPC ... H04N 1/6058; H04N 1/40012; H04N 1/60; H04N 1/32309; H04N 1/32154; H04N 1/465
See application file for complete search history.

(56) References Cited

U.S. PATENT DOCUMENTS

| | | | | |
|---|---|---|---|---|
| 7,177,465 B1* | 2/2007 | Takahira | ...................... | 382/166 |
| 7,944,594 B2* | 5/2011 | Ito et al. | ........................ | 358/518 |
| 8,285,036 B2* | 10/2012 | Hiramatsu | ..................... | 382/165 |
| 8,520,097 B2* | 8/2013 | Hoshuyama | ................... | 348/237 |
| 8,610,980 B2* | 12/2013 | Suwa et al. | ....................... | 358/518 |
| 2003/0020934 A1* | 1/2003 | Nishida | ........................... | 358/1.9 |
| 2004/0027406 A1* | 2/2004 | Nishikawa et al. | ............. | 347/19 |
| 2005/0073730 A1* | 4/2005 | Huang et al. | ................... | 358/518 |
| 2011/0069882 A1* | 3/2011 | Hiramatsu | ..................... | 382/165 |

FOREIGN PATENT DOCUMENTS

| | | |
|---|---|---|
| JP | 2003-078773 | 3/2003 |
| JP | 2009-212638 | 9/2009 |

OTHER PUBLICATIONS

A Notification of Reasons for Refusal from JPO, dated May 14, 2014, for Appl. No. JP2012-092548, 2 pgs.
The translation of the Notification of Reasons for Refusal from JPO, dated May 14, 2014, for Appl. No. JP2012-092548, 2 pgs.

* cited by examiner

*Primary Examiner* — Dung Tran
(74) *Attorney, Agent, or Firm* — Squire Patton Boggs (US) LLP

(57) ABSTRACT

Provided are a color-adjusting method and a non-transitory computer readable medium storing a color-adjusting program. The color-adjusting method is used in converting colors of a first device into colors of a second device. The method includes: using a processor of a color-conversion device to perform: representing the gamut of the second device on a lightness-chroma plane for a hue in a color system; obtaining a limiting value of a total quantity of color material; dividing a region outside the gamut into a high-lightness region and a low-lightness region, and further dividing the low-lightness region into a low-chroma region and a medium-high-chroma region based on a reference point defined according to the limiting value; defining a gamut-mapping angle for each of the resulting divided regions; and mapping out-gamut colors within the gamut of the second device by using the gamut-mapping angle.

12 Claims, 12 Drawing Sheets

FIG. 6

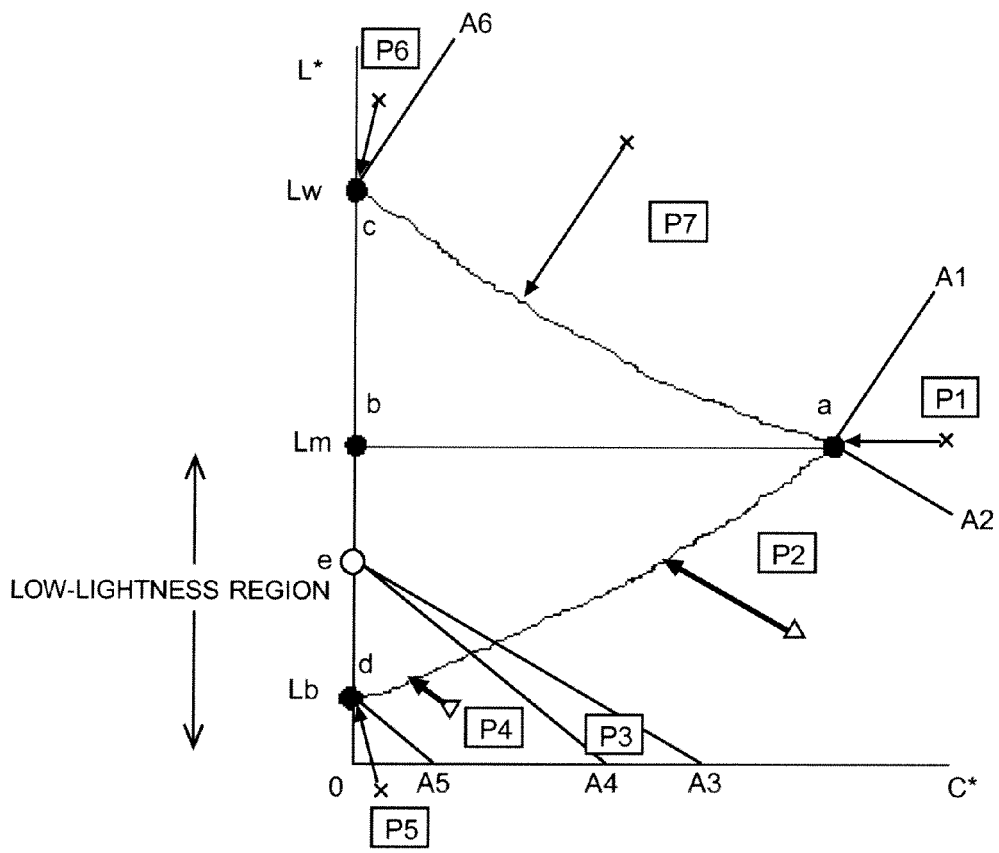

Lw=c : LIGHTNESS OF WHITE POINT
Lb=d : LIGHTNESS OF BLACK POINT
Lm=b : LIGHTNESS OF POINT OF MAXIMUM CHROMA
P1-P7 : OUT-GAMUT REGION
P2-P5 : OUT-GAMUT REGION IN LOW-LIGHTNESS REGION
P2 : MIDDLE-HIGH CHROMA REGION
e(○) : REFERENCE POINT ADJUSTED ACCORDING TO LIMITING VALUE
OF TOTAL QUANTITY OF COLOR MATERIAL
a-f(●) : FIXED REFERENCE POINTS
← : GAMUT MAPPINT DIRECTION OF EACH REGION
← : ADJUST GAMUT-MAPPING ANGLE ACCORDING TO LIMITING VALUE
OF TOTAL QUANTITY OF COLOR MATERIAL e(○) : ADJUST POSITION OF REFERENCE POINT e IN DIRECTION Lb BECAUSE OF SMALL LIMITING VALUE OF TOTAL QUANTITY OF COLOR MATERIAL
← : CHANGE GAMUT-MAPPING ANGLE BASED ON LIMITING VALUE OF TOTAL QUANTITY OF COLOR MATERIAL TO REDUCE ITS SLOPE

FIG. 8

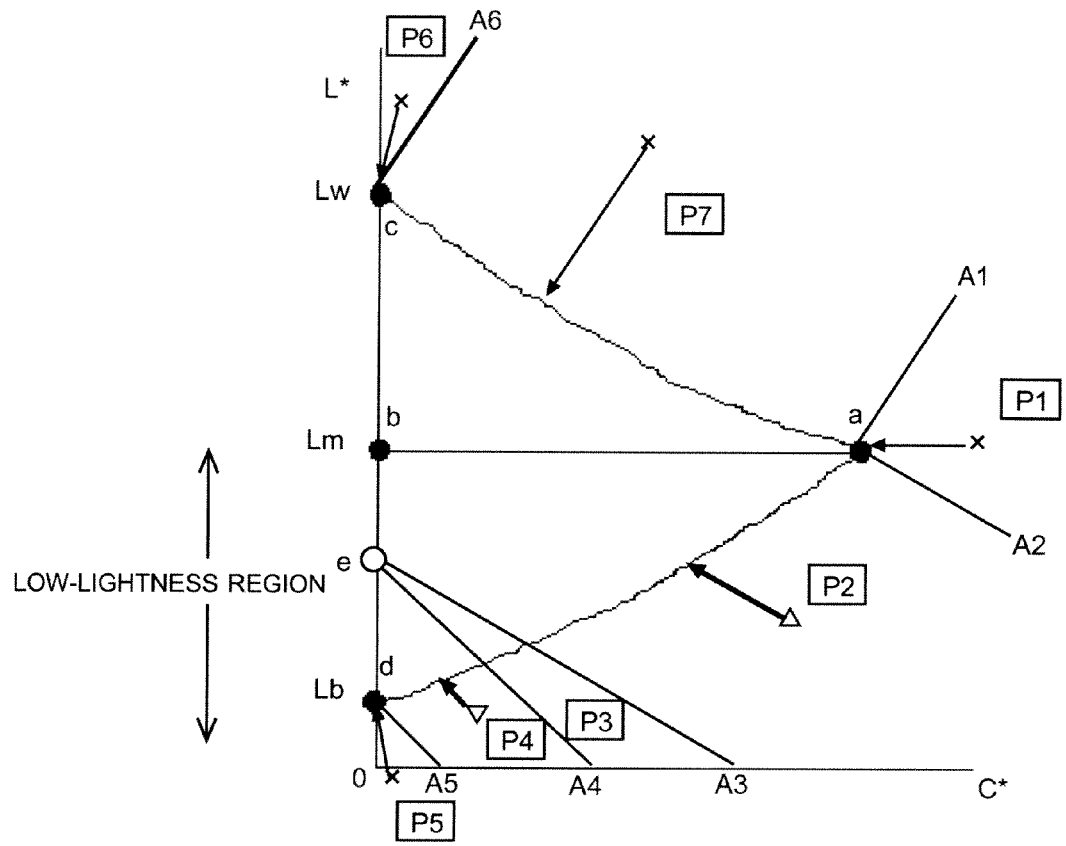

Lw=c : LIGHTNESS OF WHITE POINT
Lb=d : LIGHTNESS OF BLACK POINT
Lm=b : LIGHTNESS OF POINT OF MAXIMUM CHROMA
P1-P7 : OUT-GAMUT REGION
P2-P5 : OUT-GAMUT REGION IN LOW-LIGHTNESS REGION
P2 : MIDDLE-HIGH CHROMA REGION
e(○) : REFERENCE POINT ADJUSTED ACCORDING TO LIMITING VALUE
　　　　OF TOTAL QUANTITY OF COLOR MATERIAL
a-f(●) : FIXED REFERENCE POINTS
◀── : GAMUT MAPPINT DIRECTION OF EACH REGION
◀━━ : ADJUST GAMUT-MAPPING ANGLE ACCORDING TO LIMITING VALUE
　　　　OF TOTAL QUANTITY OF COLOR MATERIAL e(○) : ADJUST POSITION OF REFERENCE POINT e TOWARD Lb BECAUSE OF
       SMALL LIMITING VALUE OF TOTAL QUANTITY OF COLOR MATERIAL
⟵    : CHANGE GAMUT-MAPPING ANGLE BASED ON LIMITING VALUE OF
       TOTAL QUANTITY OF COLOR MATERIAL TO REDUCE ITS SLOPE

Related Art

COLOR-ADJUSTING METHOD AND NON-TRANSITORY COMPUTER READABLE MEDIUM STORING COLOR-ADJUSTING PROGRAM

This application is based on Japanese Patent Application No. 2012-092548 filed on Apr. 16, 2012, in the Japan Patent Office, the entire content of which is hereby incorporated by reference.

TECHNICAL FIELD

The present invention relates to a color-adjusting method and a non-transitory computer readable medium storing a color-adjusting program. Especially, the present invention relates to a color-adjusting method and a non-transitory computer readable medium storing a color-adjusting program, to be used for outputting an image with a color-image output device.

BACKGROUND

When colors of a first color-image output device are reproduced by a second color-image output device whose gamut is different from the gamut of the first color-image output device, there is used a method to convert CMYK values representing colors of the first color-image output device into color system values (L*a*b* values) and to convert the color system values into CMYK values representing colors of the second color-image output device. At that time, because color system values usually cover a wider region than the gamut (a color-reproducible region) of a color-image output device, there is preformed, in creating a lookup table for converting color system values into CMYK values, processing to adjust the color system values of out-gamut colors, which are located outside the gamut of a color-image output device, so as to move the out-gamut colors within the gamut (which is referred as a gamut mapping).

As for the gamut mapping, for example, JP-A No. 2003-78773 discloses a color-adjusting method of performing a color conversion of image data so as to obtain an output which is consistent to colors of a first color-image output device by using a second color-image output device. In a step of creating a lookup table in the method, the following operation is performed for combinations of color system values which correspond to colors located outside a color-reproducible region reproduced by the color-image output device using basic color values consisting of three or four color components. In the condition that the lightness value of a color is greater than the lightness value of the point of maximum chroma of the color-reproducible region at the hue of the color, the color is moved inside the color-reproducible region in the direction to reduce its chroma value and its lightness value. In the condition that the lightness value of a color is smaller than the lightness value of the point of maximum chroma, the color is moved inside the color-reproducible region in the direction to reduce its chroma value and increase its lightness value. Thereby, values of basic colors consisting of four or three color components are calculated for a combination of color system values of each color outside the color-reproducible region.

Further, printing on thin paper by using a color-image output device, sometimes causes a situation that the quantity of color material to be used is requested to be reduced in order to prevent color material on the reverse side from showing through the paper. In order to save a consumption of resources for printing, it has been performed to employ a color-material-saving function to use the reduced quantity of color material. When the quantity of color material used is saved as described above, the gamut which is reproducible by a color-image output device becomes narrow, which makes a phenomenon that the color-reproducing accuracy, especially the color-reproducing accuracy in the low-lightness area, is deteriorated.

To solve the problem, for example, JP-A No. 2009-212638 discloses the method to be used under the condition that a first color signal representing colors described by a certain color space is converted into a second color signal representing colors described by another color space handled by an image forming device. Under the condition, a limiting value of the total amount of the second color signal, which is defined for each of colors represented by the first color signal, is calculated in the following manner. The limiting value is increased when chroma of a color represented by the first color signal is high, and is reduced when the chroma of a color represented by the first color signal is low. Further, the limiting value is increased when the lightness of a color represented by the first color signal is high and is reduced when the lightness of a color represented by the first color signal is low.

However, in the method of JP-A No. 2003-78773, a gamut mapping is performed for each color in the region where lightness values are lower than the lightness value of the point of maximum chroma (referred as a low-lightness region) so as to reduce its chroma value and increase its lightness value without exception, regardless its chroma value. Therefore, when the gamut of the second color-image output device is much narrower than the gamut of the first color-image output device, lightness values greatly change in the middle-chroma and high-chroma regions in the low-lightness region, which makes a problem that the color-reproducible accuracy and gradation are deteriorated.

The method of JP-A 2009-212638 allows the color-reproducing accuracy to be maintained in a certain extent. However, the limiting value of the total amount of color signal of CMYK becomes large in a high-chroma region. Therefore, in an image wherein a color region of second colors is great, the limiting value becomes large in total, which makes a problem that it goes against the purpose to reduce the limiting value. The present invention seeks to solve these problems.

SUMMARY

There are disclosed an illustrative color-adjusting method and a non-transitory computer readable medium storing a color-adjusting program.

An illustrative color-adjusting method reflecting one aspect of the present invention is a color-adjusting method to be used in a color conversion which converts colors of a first device into colors of a printer as a second device having a gamut being different from a gamut of the first device, for mapping out-gamut colors outside the gamut of the second device within the gamut of the second device in the color conversion. The method comprises: using a processor of a device which performs the color conversion to perform the following steps. The steps include a first step of representing the gamut of the second device on a plane defined by a lightness axis and a chroma axis at a hue in a color system, by using values obtained by color measurement of a color chart which has been outputted by the second device. The steps further include a second step of obtaining a limiting value of a total quantity of color material which determines a total quantity of color material used when the second device outputs the color chart. The steps further include a third step of dividing a region outside the gamut of the second device into a high-lightness region and a low-lightness region, based on a point of maximum chroma of the gamut of the second device and a white point and a black point of the gamut of the second device on the lightness axis, where lightness values are higher than a lightness value of the point of maximum of chroma in the high-lightness region and lightness values are lower than the lightness value of the point of maximum of chroma in the low-lightness region, and of further dividing the low-lightness region into a low-chroma region and a medium-high-chroma region, based on a reference point defined according to the limiting value of the total quantity of color material, wherein chroma values of the low-chroma region are lower than chroma values of the medium-high-chroma region. The reference point is set between the lightness value of the point of maximum of chroma and a lightness value of the black point both located on the lightness axis. The steps further include a fourth step of defining a gamut-mapping angle for mapping the out-gamut colors within the gamut of the second device, for each of the high-lightness region, the low-chroma region in the low-lightness region and the medium-high-chroma region in the low-lightness region. The gamut-mapping angle is defined as "lightness/chroma". The steps further include a fifth step of adjusting a lightness value and a chroma value of each of the out-gamut colors so as to shift the each of the out-gamut colors in the plane at the gamut-mapping angle corresponding to a region, where the region is one of the high-lightness region, the low-chroma region and the medium-high-chroma region and includes the each of the out-gamut colors, to perform mapping the out-gamut colors within the gamut of the second device.

An illustrative non-transitory computer readable medium reflecting one aspect of the present invention is a non-transitory computer readable medium storing a color-adjusting program to be executed in a device for performing a color conversion wherein colors of a first device are converted into colors of a printer as a second device having a gamut being different from a gamut of the first device. The color-adjusting program causes a processor of the device, for mapping colors outside the gamut of the second device into the gamut of the second device, to perform the following processes. The processes include a first process of representing the gamut of the second device on a plane defined by a lightness axis and a chroma axis at a hue in a color system, by using values obtained by color measurement of a color chart which has been outputted by the second device. The processes further include a second process of obtaining a limiting value of a total quantity of color material which determines a total quantity of color material used when the second device outputs the color chart. The processes further include a third process of dividing a region outside the gamut of the second device into a high-lightness region and a low-lightness region, based on a point of maximum chroma of the gamut of the second device and a white point and a black point of the gamut of the second device on the lightness axis, where lightness values are higher than a lightness value of the point of maximum of chroma in the high-lightness region and lightness values are lower than the lightness value of the point of maximum of chroma in the low-lightness region, and of further dividing the low-lightness region into a low-chroma region and a medium-high-chroma region, based on a reference point defined according to the limiting value of the total quantity of color material, wherein chroma values of the low-chroma region are lower than chroma values of the medium-high-chroma region. The reference point is set between the lightness value of the point of maximum of chroma and a lightness value of the black point both located on the lightness axis. The processes further include a fourth process of defining a gamut-mapping angle for mapping the out-gamut colors within the gamut of the second device, for each of the high-lightness region, the low-chroma region in the low-lightness region and the medium-high-chroma region in the low-lightness region. The gamut-mapping angle is defined as "lightness/chroma". The processes further include a fifth step of adjusting a lightness value and a chroma value of each of the out-gamut colors so as to shift the each of the out-gamut colors in the plane at the gamut-mapping angle corresponding to a region, where the region is one of the high-lightness region, the low-chroma region and the medium-high-chroma region and includes the each of the out-gamut colors, to perform mapping the out-gamut colors within the gamut of the second device.

Other features of illustrative embodiments will be described below.

BRIEF DESCRIPTION OF THE DRAWINGS

Embodiments will now be described by way of example only, with reference to the accompanying drawings which are meant to be exemplary, not limiting, and wherein like elements numbered alike in several figures, in which:

FIG. 6 is a diagram illustrating a gamut mapping (for a second color and a large limiting value of the total quantity of color material) relating to Example 1;

FIG. 8 is a diagram illustrating a gamut mapping (for a primary color and a large limiting value of the total quantity of color material) relating to Example 1;

DETAILED DESCRIPTION

Figure 1:
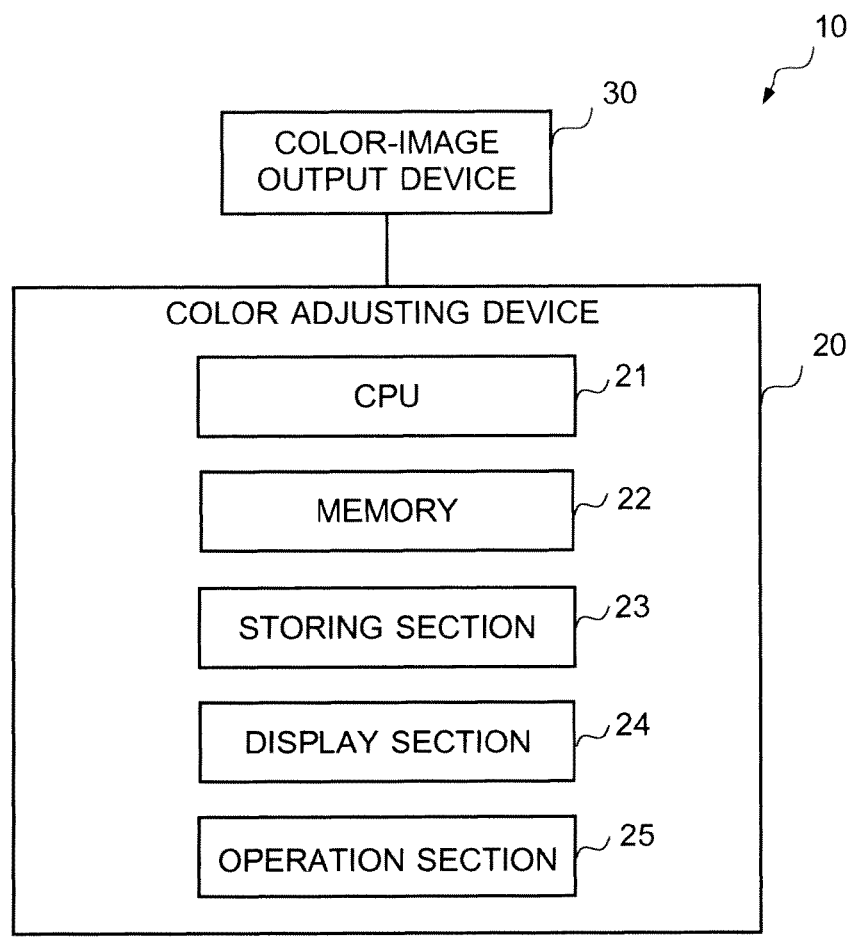
FIG. 1 is a block diagram illustrating a structure of an image output system relating to Example 1.

Illustrative embodiments of color-adjudging methods and non-transitory computer readable media each storing a color-adjusting program will be described below with reference to the drawings. It will be appreciated by those of ordinary skill in the art that the description given herein with respect to those figures is for exemplary purposes only and is not intended in any way to limit the scope of potential embodiments may be resolved by referring to the appended claims.

The illustrative color-adjusting method and a non-transitory computer readable medium storing a color-adjusting program allow a color-image output device to enhance the accuracy of color reproduction in the low-lightness region and to maintain the gradation characteristics because of the following operations, even when the color-image output device is used with a reduced quantity of color material.

When out-gamut colors outside the gamut of the color-image output device are mapped to the inside of the gamut in the color conversion wherein colors of a target device are converted into colors of the color-image output device, the color-adjusting method causes a processor of a device for performing a color conversion to perform the following processes. A limiting value of a total quantity of color material which determines the total quantity of color material used when the second device outputs the color chart is obtained. Then, on a plane represented by lightness and chroma at a hue of a color system, there are defined a point of maximum chroma, white and black points on the lightness axis and a reference point on the lightness axis defined based on the limiting value of the total quantity of color material. The low-lightness region outside the gamut of the second device is divided based on the reference point into a low-chroma region and a medium-high-chroma region, where a gamut-mapping angle for the middle-high-chroma region is defined to be smaller than the gamut-mapping angle for the low-chroma region. Then, the mapping is performed such that a change in the lightness value of each of the out-gamut colors in the medium-high chroma region is smaller than a change in the lightness value of each of the out-gamut colors in the low-chroma region.

Further, a color of an intermediate hue defined between predetermined reference hues is mapped based on reflectivities each defined by using a hue-angle difference of a hue of the color and each of the reference hues neighboring to the hue of the color. When the reference hues are a primary color and a second color and the hue-angle differences of the hue of the color and the respective reference hues are the same to each other, a reflectivity of the second color is defined to be higher than a reflectivity of the primary color.

As described in the above description about the background, there has been provided a method, in gamut mapping, to shift each color whose lightness is higher than the lightness of the point of the maximum chroma in the direction to reduce its chroma value and lightness value and to shift a color whose lightness is lower than the lightness of the point of the maximum chroma in the direction to reduce its chroma value and increase its lightness value. Further, there has been provided a method for avoiding deterioration of a color-reproducing accuracy in the situation that the quantity of used color material is reduced, to increase the limiting value of the color material for colors whose lightness and chroma are high and to decrease the limiting value for colors whose lightness and chroma are low.

However, the former method performs the gamut mapping so as to reduce the chroma value and increase the lightness value of every color in a low-lightness region regardless its chroma value. Therefore, lightness of colors greatly changes in middle-chroma and high-chroma regions in the low-lightness region, which makes a problem that the accuracy of color reproduction and gradation characteristics of the resulting image are deteriorated. In the latter method, the quantity of used color material in the high-chroma region is increased, which makes a problem that both of the reduced quantity of used color material and the enhanced accuracy of color reproduction are hardly achieved.

To solve the problems, in an illustrative embodiment of the present invention, when a lookup table for constructing a device profile of a color-image output device (a lookup table for converting L*a*b* values into CMYK values) is created, the way of the gamut mapping performed in the low-lightness region is changed according to the limiting value of the total quantity of CMYK colors (the limiting value of the total quantity of color material) obtained when the a color-image output device outputs a color chart.

Concretely, there is provided a reference point to divide the low-lightness region into a low-chroma region and a middle-high-chroma region. The way is changed so as to reduce the absolute value of a gamut-mapping angle (make a slope represented by "lightness/chroma" gentle) in the high-chroma region. Further, when the limiting value of the total quantity of color material is small, the position of the reference point is changed such that the area where the absolute value of the gamut-mapping angle is small extends toward the low-chroma side.

Example 1

Figure 2:
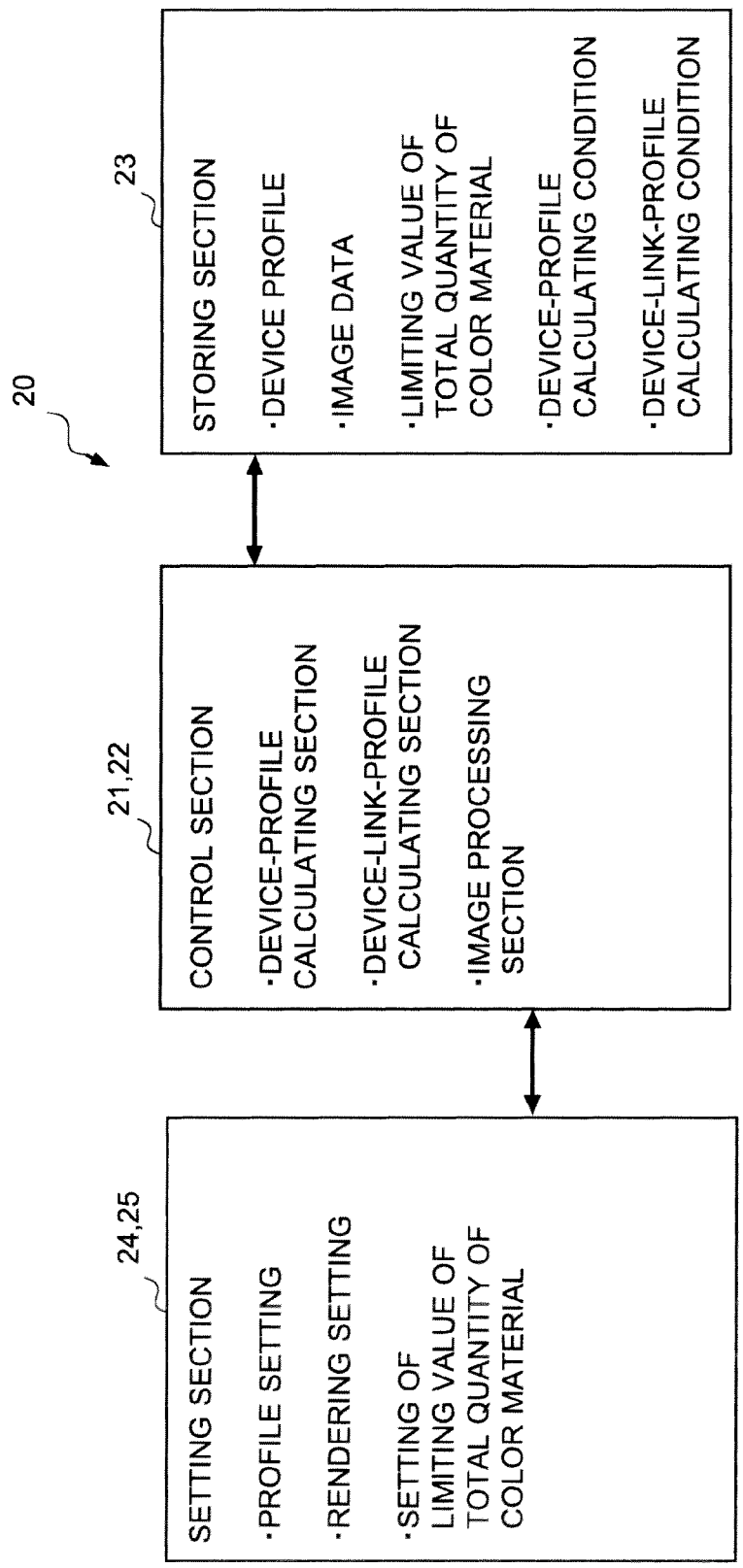
FIG. 2 is a block diagram illustrating a detailed structure of a color-adjusting device relating to Example 1.
Figure 3:
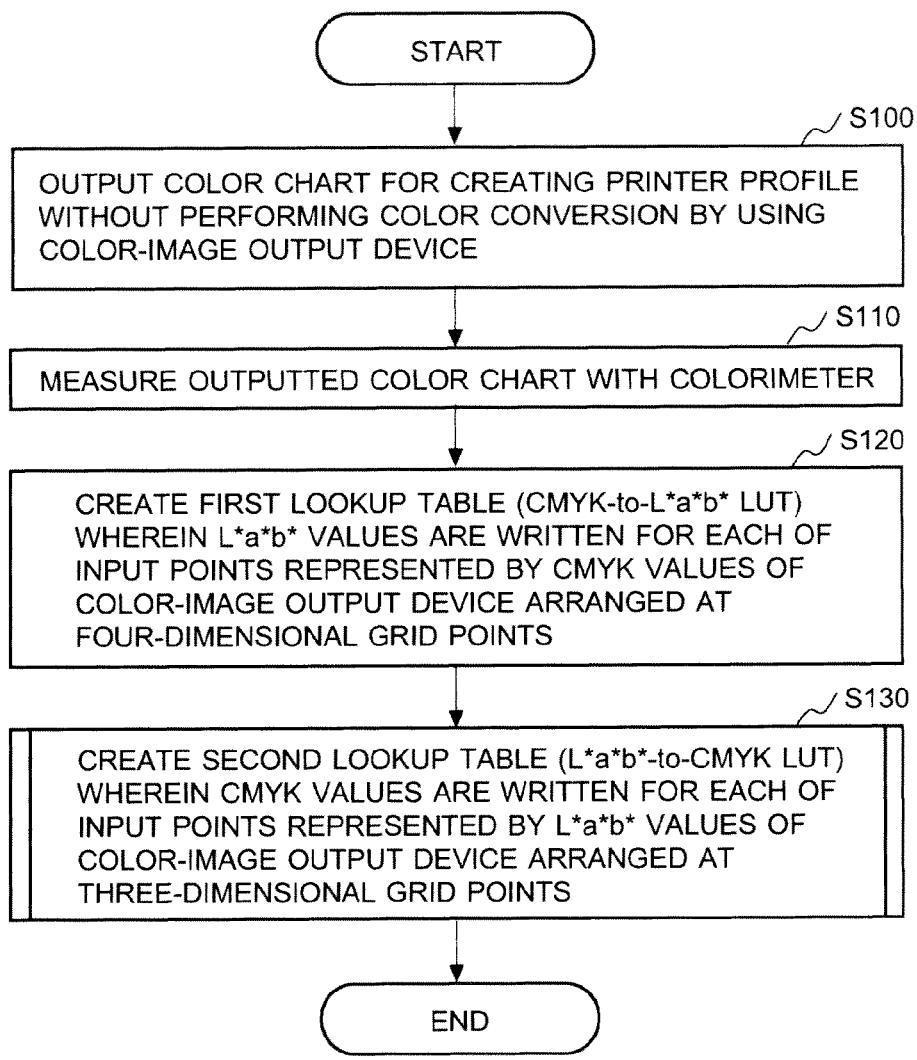
FIG. 3 is a flowchart illustrating operations of the color-adjusting device (creating a printer profile) relating to Example 1.
Figure 4:
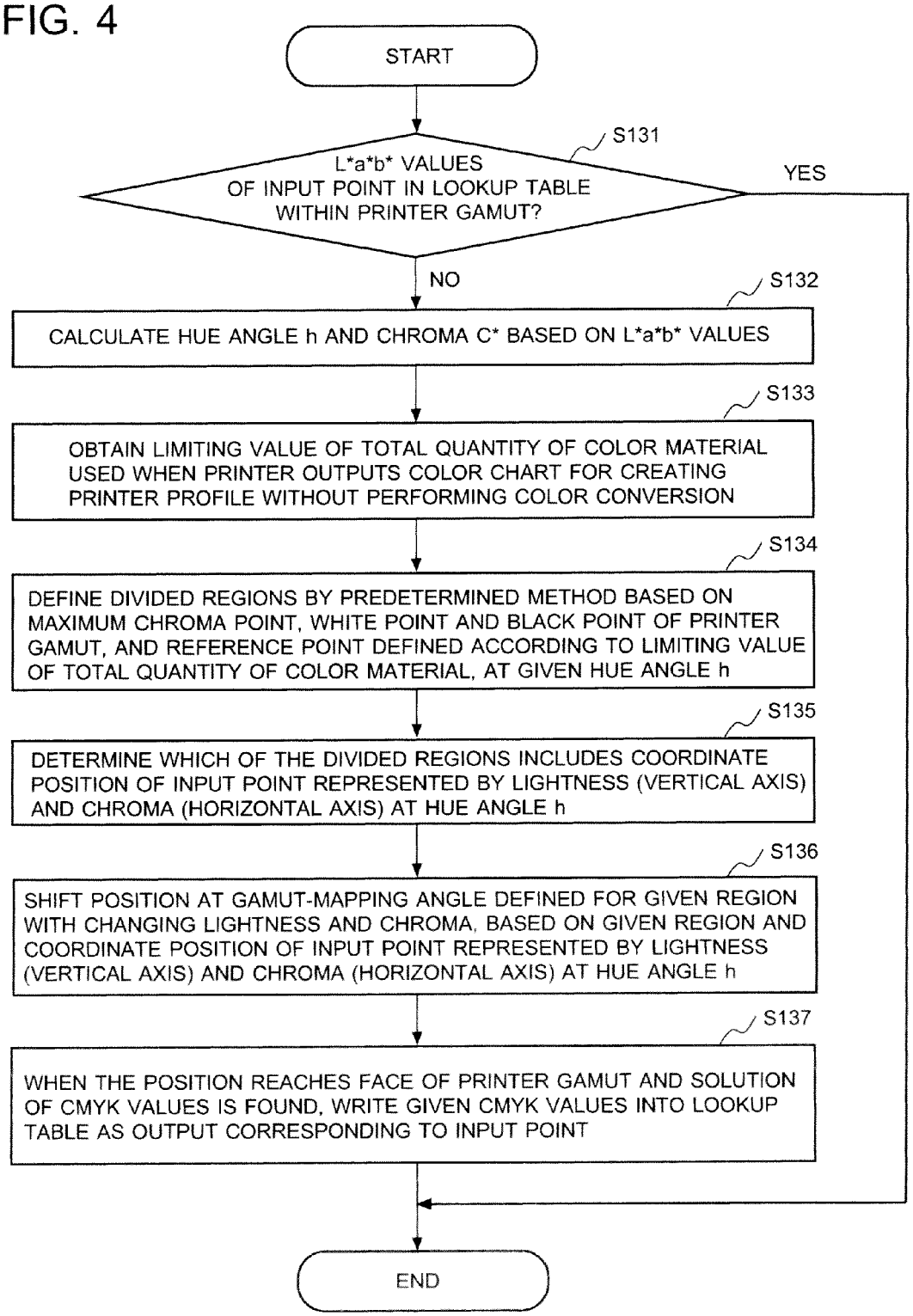
FIG. 4 is a flowchart illustrating operations of the color-adjusting device (creating a second lookup table of the printer profile) relating to Example 1.
Figure 5:
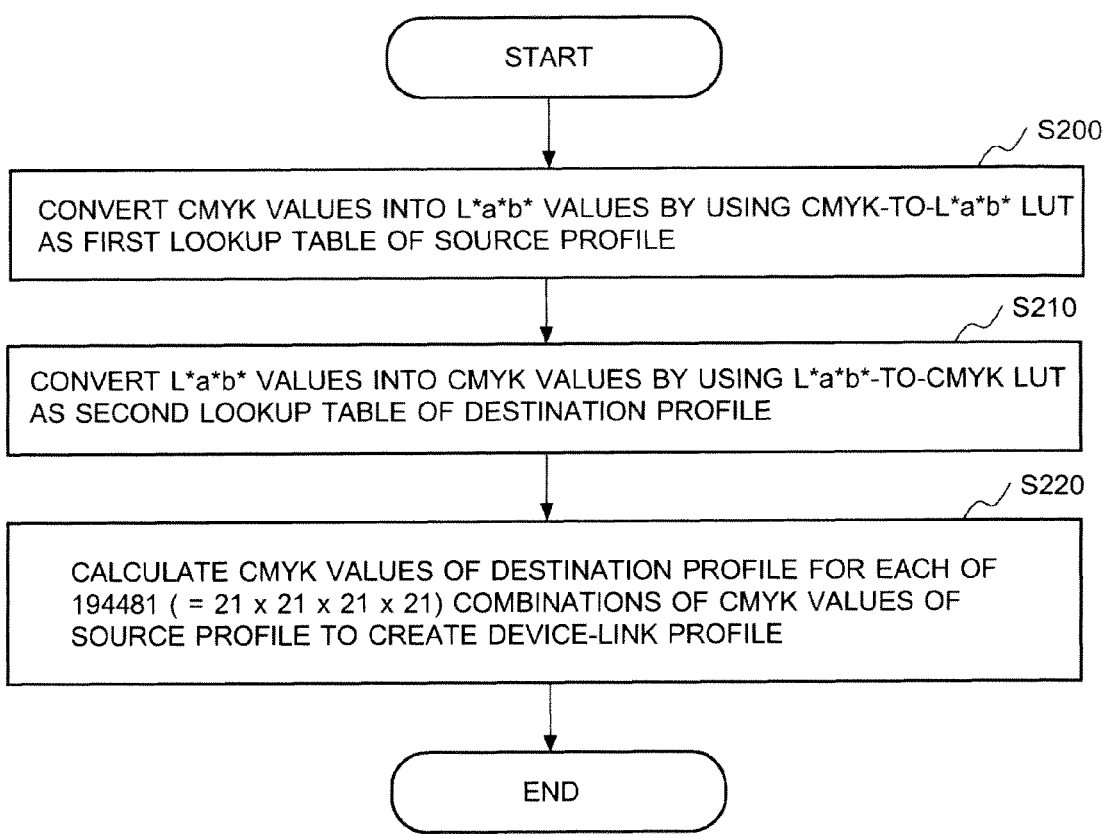
FIG. 5 is a flowchart illustrating operations of the color-adjusting device (creating a device profile in the case that input values are CMYK values) relating to Example 1.
Figure 10:
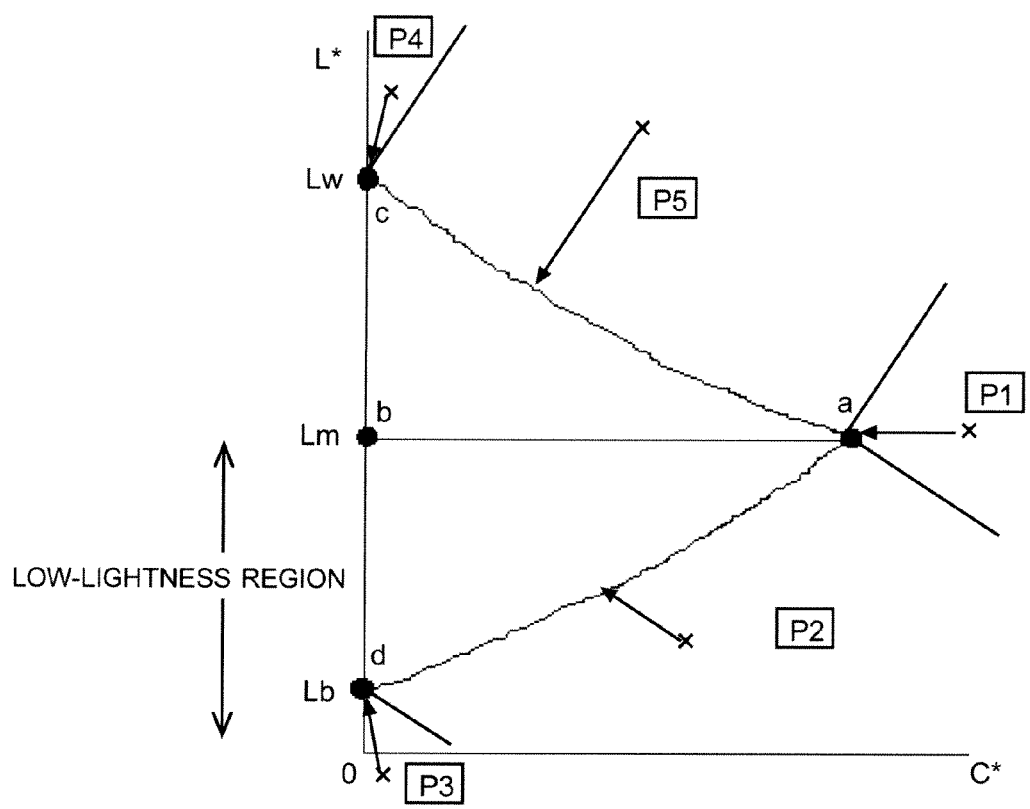
FIG. 10 is a diagram illustrating a conventional gamut mapping.
Figure 11:
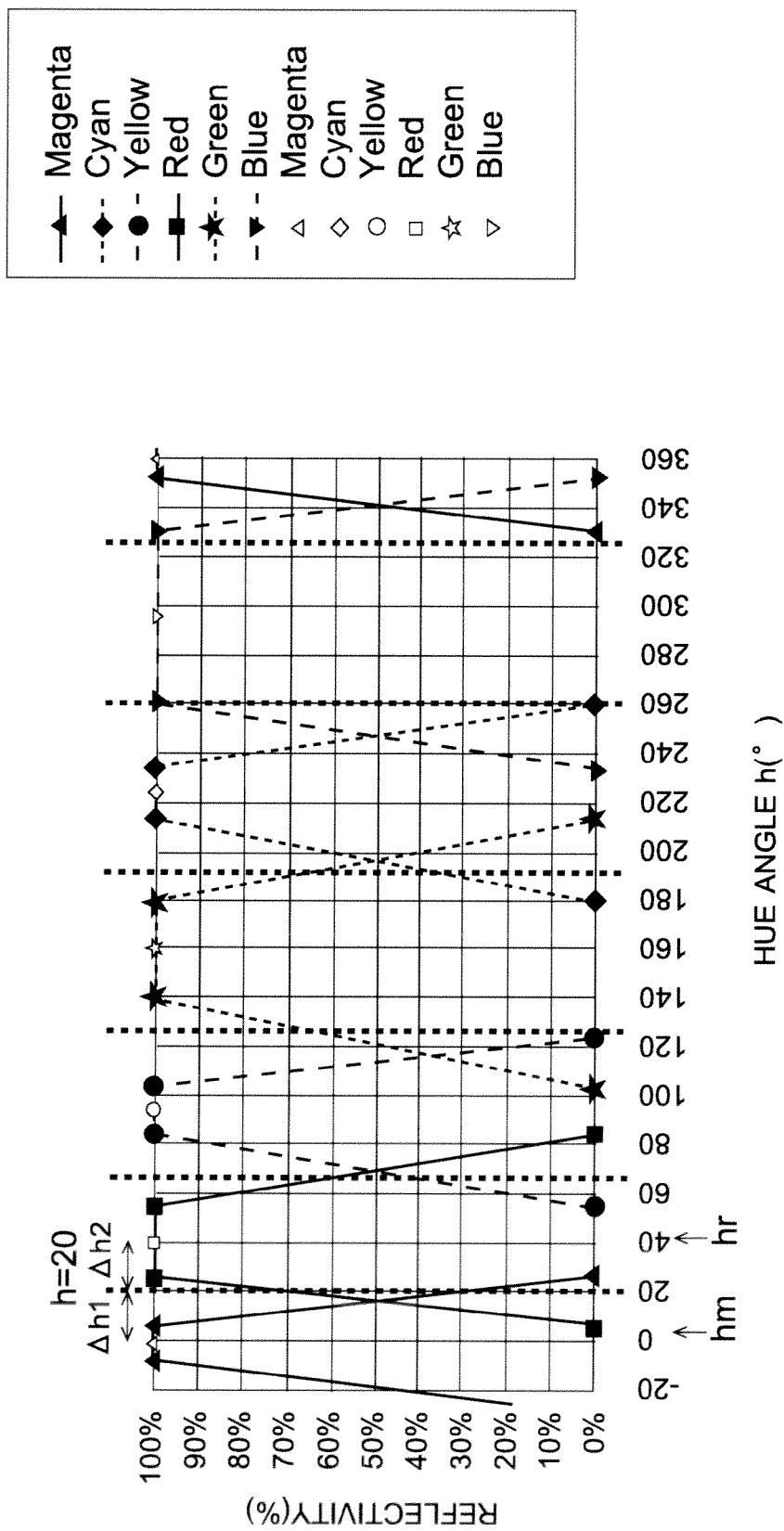
FIG. 11 is a diagram showing a relationship of a mapping region and reflectivities with respect to hue angles of the gamut mapping.

A color-adjusting method and a color-adjusting program relating to Example 1 will be described with reference to FIGS. 1 to 11, for illustrating the above-described embodiments in detail. FIG. 1 is a block diagram illustrating a structure of an image output system relating to the present example. FIG. 2 is a block diagram illustrating a detailed structure of a color-adjusting device relating to the present example. Each of FIGS. 3 to 5 is a flowchart illustrating operations of a color-adjusting device relating to the present example. Each of FIGS. 6 to 9 is a diagram illustrating a gamut mapping relating to the present example. FIG. 10 is a diagram illustrating a conventional gamut mapping. FIG. 11 is a diagram showing a relationship a mapping area and reflectivities with respect to hue angles of the gamut mapping.

As shown in FIG. 1, image output system 10 of the present example is composed of a printer for outputting color printed matter (referred as color-image output device 30) and color-adjusting device 20 for performing a color adjustment to enhance the color-reproducing accuracy of color-image output device 30. The color-adjusting device 20 is composed of CPU (Central Processing Unit) 21, memory 22, storing section 23, display section 24 and operation section 25, which are connected through a bas to each other.

Color-adjusting device 20 may be formed to be one body together with color-image output device 30, or may include a communication interface section such as a NIC (Network Interface Card) to work as a structure connected with color-image output device 30 through a communication network defined by standards such as ETHERNET (trademark), a token ring and FDDI (Fiber-Distributed Data Interface).

Next, functions of color-adjusting device 20 will be described with reference to FIG. 2.

CPU 21 and memory 22 including RAM (Random Access Memory) and ROM (Read Only Memory) form a control section. The control section works as a device-profile-calculating section for creating a device profile such as a first lookup table for converting CMYK values into L*a*b* values and a second lookup table for converting L*a*b* values into CMYK values; a device-link-profile-calculating section for creating a device-link profile for associating a device profile of a device to be a target with a device profile of color-image output device 30; and an image processing section for performing color conversion of images by using the device-link profile.

Storing section 23 is composed of components including a HDD (Hard Disk Drive). Storing section 23 stores programs which cause CPU 21 to control various sections (such as a color-adjusting program working as the device-profile-calculating section, device-link-profile-calculating section and image processing section) and stores information relating to processing functions of the device itself. The programs and information are read by CPU 21 when they are required and are executed and processed on memory 22. In the present example, storing section 23 stores created device profiles, image data to which color conversion is applied, a value for limiting the total quantity of color material to be used (referred as a limiting value of the total quantity of color material), a condition of calculating a device profile, and a condition of calculating a device-link profile.

Display section 24 is composed of components including a LCD (Liquid crystal display) and operation section 25 is composed of components including a hardware key and a touch panel. Display section 24 and operation section 25 form a setting section. The setting section allows the color-adjusting device to perform profile setting for creating a device profile, rendering setting for image processing and setting of the limiting value of the total quantity of color material for reducing the quantity of color material to be used.

Hereinafter, assuming that a source profile is a device profile of a target device (an offset printing press in the present example) and a destination profile is a device profile of color-image output device 30 as a second device (referred as a printer profile) whose gamut is different from that of the first device, there will be described processes of a color conversion wherein a device-link profile is created by using a source profile and a destination profile, in order.

Creating Device Profile of Offset Printing Press:

First, a color chart (a ISO 12642 color chart) is offset-printed by an offset printing press, and a color measurement of the color chart printed on paper is performed with a colorimeter. Then, a lookup table forming a device profile of the offset printing press is calculated based on the measured values of the colorimeter. Concretely, there is created a first lookup table wherein L*a*b* values are described for each of input points given as CMYK values at four-dimensional-grid points.

The device profile can be calculated by using the method disclosed in JP-A No. 2003-78773. In the present example, the device profile of the offset printing press has been created based on the measured values obtained by measuring a color chart with a colorimeter. However, when the device profile of the offset printing press has been distributed previously, the given device profile may be used in place of the calculation.

Creating Device Profile of Color Image output Device 30:

As shown in the flowchart of FIG. 3, a color chart for creating the above-described device profile is printed with color image output device 30 without color conversion (S100), and the color chart printed on paper is measured with the above-described colorimeter (S110). Then, color-adjusting device 20 (color-adjusting program) obtains the measured values from the colorimeter through a network or a recording medium, and creates a first lookup table and a second lookup table for forming the device profile of color-image output device 30.

Concretely, color-adjusting device 20 creates the first lookup table wherein L*a*b* values for each of input points which are represented as CMYK values and arranged at four-dimensional grid points are described, similarly to the above (S120). The first lookup table stores, for example, L*a*b* values for each of 6561 points as 9×9×9×9 points of CMYK values. As for the points at which measured values of the color chart are not located among the 6561 points, L*a*b* values for the points may be calculated by interpolation based on the values of the neighboring points.

Next, color-adjusting device 20 creates the second lookup table wherein CMYK output values for each of input points which are represented as L*a*b* values and arranged at three-dimensional grid points are described, similarly to the above (S130). The second lookup table stores, for example, CMYK values for each of 35937 points as 33×33×33 points of L*a*b* values.

As for the way to create the second lookup table, color-adjusting device 20 performs gamut mapping for adjusting color system values of colors located outside the color-reproducible region of color-image output device 30 to be moved into the color-reproducible region because the color system values cover a wider region than the color-reproducible region of color-image output device 30. In the conventional method, lightness values of colors greatly change in a middle-chroma region and high-chroma region in a low-lightness region, which deteriorates the color-reproduction accuracy and the gradation characteristics. Therefore, the present example employs the processes according to the flowchart of FIG. 4.

First, the color-adjusting device 20 judges whether L*a*b* values of an input point represents a color located within the gamut of color-image output device 30 (S131). When the color-adjusting device 20 judges that the L*a*b* values of the input point represents a color located within the gamut, there is no need to perform a gamut mapping. The color-adjusting device 20 writes the CMYK values corresponding to the L*a*b* values as an output value in the second lookup table and terminates the calculation of the input point. When the color-adjusting device 20 judges that the L*a*b* values of the input point represents a color located outside the gamut, the color-adjusting device 20 calculates hue angle h and chroma value C* based on L*a*b* values by using the following expressions (1) and (2) (S132).

$$h = \arctan(b^*/a^*)/\pi \times 180 \tag{1}$$

$$C^* = ((a^{*}{}^2) + (b^{*}{}^2))^{0.5} \tag{2}$$

Next, the color-adjusting device 20 obtains a limiting value of the total quantity of color material used when a color chart for creating the above-described device profile is printed without color conversion by using color-image output device 30 (S133). As for the limiting value of the total quantity of color material, a limiting value of the total quantity of color material which has been inputted on a setting screen of color-adjusting device 20 under manual operation may be used. Alternatively, a limiting value of the total quantity of color material (the total quantity of color material which has been used by the device) obtained from color-image output device 30 may be used. When color-image output device 30 has a color-material-saving mode, the color-adjusting device 20 may obtain a limiting value of the total quantity of color material corresponding to the saving mode.

Next the color-adjusting device 20 calculates lightness value L*max and chroma value C*max of the point of the maximum chroma of the gamut of color-image output device 30 at hue angle h calculated by using the expression (I). The lightness value L*max and chroma value C*max of the point of the maximum chroma can be calculated by, for example, the following way. Considering combinations of C, M and Y values located on the lines connecting points of M100%-M100%Y100%-Y100%-C100%Y100%-C100%-C100%M100%-M100%, the values of h and C* are calculated similarly to the above by using the expressions (1) and (2) based on the values of L*, a* and b* corresponds to each of the combinations of CMY values. Then an interpolation of the lightness values L* and chroma values C* at the hue angle h is performed to obtain the lightness value L*max and the chroma value C*max.

Then, the color-adjusting device 20 defines divided regions by a predetermined method based on the lightness value and the chroma value of the point of the maximum chroma, the lightness value of the white point, the lightness value of the black point, and the lightness value of a reference point defined based on the limiting value of the total quantity of color material (S134). The color-adjusting device 20 determines which of the divided regions includes the coordinate position, which is represented by the lightness and chroma, of the input point at the hue angle h (S135). The color-adjusting device 20 shifts the lightness value and the chroma value of the input point by using the gamut-mapping angle defined according to the given region (S136). When the resulting position reaches the front of the gamut of color-image output device 30 and the solution of the CMYK values is found, the color-adjusting device 20 writes the given CMYK values (the coordinates of the destination point) into the second lookup table as an output point corresponding to the input point, and, at the same time, calculates a color difference between the L*a*b* values after the gamut mapping and the L*a*b* values before the gamut mapping (S137). The detailed processes of S134 to S137 will be described below.

Creating Device-Link Profile:

Next, creating a device-link profile will be described with reference to the flowchart of FIG. 5. In the present example, the two-step processing of the conversion is reduced into one step processing in order to perform fast color conversion. To achieve the reduction, the color-adjusting device 20 creates a device-link profile based on a first lookup table which forms a device profile of the offset printing press and a second lookup table which forms a device profile of color-image output device 30. The device profiles can be calculated by using the method disclosed in JP-A No. 2003-78773.

First, color-adjusting device 20 (color-adjusting program) converts CMYK values into L*a*b* values by using the CMYK-to-L*a*b* LUT as a first lookup table of a source profile (a device profile of the offset printing press) (S200), and then, converts the L*a*b* values into CMYK values by using the L*a*b*-to-CMYK LUT as a second lookup table of a destination profile (a device profile of color-image output device 30) (S210). Next, color-adjusting device 20 calculates CMYK values of the destination profile for each of 194481 (=21×21×21×21) combinations of CMYK values of the source file to create a device-link profile (S220). After that, color-adjusting device 20 performs color conversion of an image with applying the created device-link profile and causes color-image output device 30 to output the resulting image.

Herein, there has been cited the example to create the device-link profile. However, color-adjusting device 20 may output an image after performing two-step conversion based on a source profile and a destination profile without using a device-link profile.

Next, there will be described the way to define the divided regions according to the limiting value of the total quantity of color material in creating the second lookup table of FIG. 4 (S134) and the way to calculate the coordinates of the destination points of lightness and chroma in each of the divided regions (S135 to S137), concretely with reference to FIG. 6.

FIG. 6 is a diagram illustrating the gamut of color-image output device 30 represented on a plane with lightness as the vertical axis and chroma as the horizontal axis (which corresponds to across section given by cutting the L*a*b* color space at a certain hue along a certain direction such that the cross section includes the L axis). In FIG. 6, the point of maximum chroma is represented as reference point a, white point Lw on the lightness axis is represented as reference point c and black point Lb on the lightness axis is represented as reference point d. Further, lightness Lm of the point of maximum chroma, located on the lightness axis, is represented as reference point b. In the present example, there is further provided reference point e in the region between point b and point d (the low-lightness region) on the lightness axis. The reference point e is a reference point which divides the low-lightness region into a middle-high-chroma region and a low-chroma region and is adjustable so as to move according to the limiting value of the total quantity of color material. In FIG. 6, a fixed reference point is represented by a closed circle and an adjustable reference point is represented by an open circle.

Based on these reference points, color-adjusting device 20 defines divided regions in the following manner. Each of regions P2 and P4 is located under the gamut and gamut mapping is performed with a constant slope in those regions. Region P7 is located above the gamut and gamut mapping is performed with a constant slope in the region. First, the color-adjusting device 20 defines the slope (a gamut-mapping angle) for each of regions P2, P4 and P7. In this operation, lightness of the point of maximum chroma is located at a different position depending on the hue. For example, the lightness of the point of maximum chroma of a yellow hue is located in a high-lightness region. On the other hand, the lightness of the point of maximum chroma of a blue hue is located in a low-lightness region. Therefore, the color-adjusting device 20 defines a proper gamut-mapping angle corresponding to the gamut shape of each hue. Assuming that the absolute values of gamut-mapping angles of regions P2 and P4 located under the gamut are S2 and S4, respectively, the color-adjusting device 20 defines the values S2 and S4 so as to be the slopes satisfying the expression (3).

$$S4 > S2 \quad (3)$$

After determining the gamut-mapping angles of regions P2, P4 and P7, the color-adjusting device 20 defines borderlines of the regions according to their gamut-mapping angles. Concretely, the color-adjusting device 20 defines the line joining points a and A2 as the borderline of regions P1 and P2 and the line joining points e and A3 as the borderline of regions P2 and P3 so that their slopes are same as gamut-mapping angle S2 of regions P2. The color-adjusting device 20 further defines the line joining points e and A4 as the borderline of regions P3 and P4 and the line joining points d and A5 as the borderline of regions P4 and P5 so that their slopes are same as gamut-mapping angle S4 of regions 94. The color-adjusting device 20 further defines the line joining points c and A6 as the borderline of regions P6 and P7 and the line joining points a and A1 as the borderline of regions P7 and P1 so that their slopes are same as gamut-mapping angle S7 of regions P7. Thereby, the color-adjusting device 20 can determine which of the divided regions includes the coordinate position of each input point represented by lightness and chroma, by using the borderlines.

Next, the color-adjusting device 20 calculates the coordinates of the destination point of the mapping process. As for each of input points in the regions P2, P4 and P7 wherein the mapping is performed with a constant slope, the color-adjusting device 20 shifts the point at the gamut-mapping angle defined according to its region with adjusting its lightness value and chroma value, and determines the coordinates obtained when it reaches the gamut as the coordinates of the destination point. On the other hand, in the regions P1, P3, P5 and P6, the coordinate point is mapped toward a reference value corresponding to the regions. In region P3, the color-adjusting device 20 determines the coordinates on the line segment joining an input point and the point e within the gamut as coordinates of a destination point. Similarly, the color-adjusting device 20 determines the coordinates on the line segment joining an input point and the point d within the gamut as coordinates of a destination point in region P5, determines the coordinates on the line segment joining each input point and the point c within the gamut as coordinates of a destination point in region P6, and determines the coordinates on the line segment joining each input point and the point a within the gamut as coordinates of a destination point in region P1.

Next, there will be described the way to define the reference point e which divides the low-lightness region into the middle-high chroma region and the low-chroma region, according to the limiting value of the total quantity of color material, concretely with reference to FIGS. 6 to 10.

Figure 7:
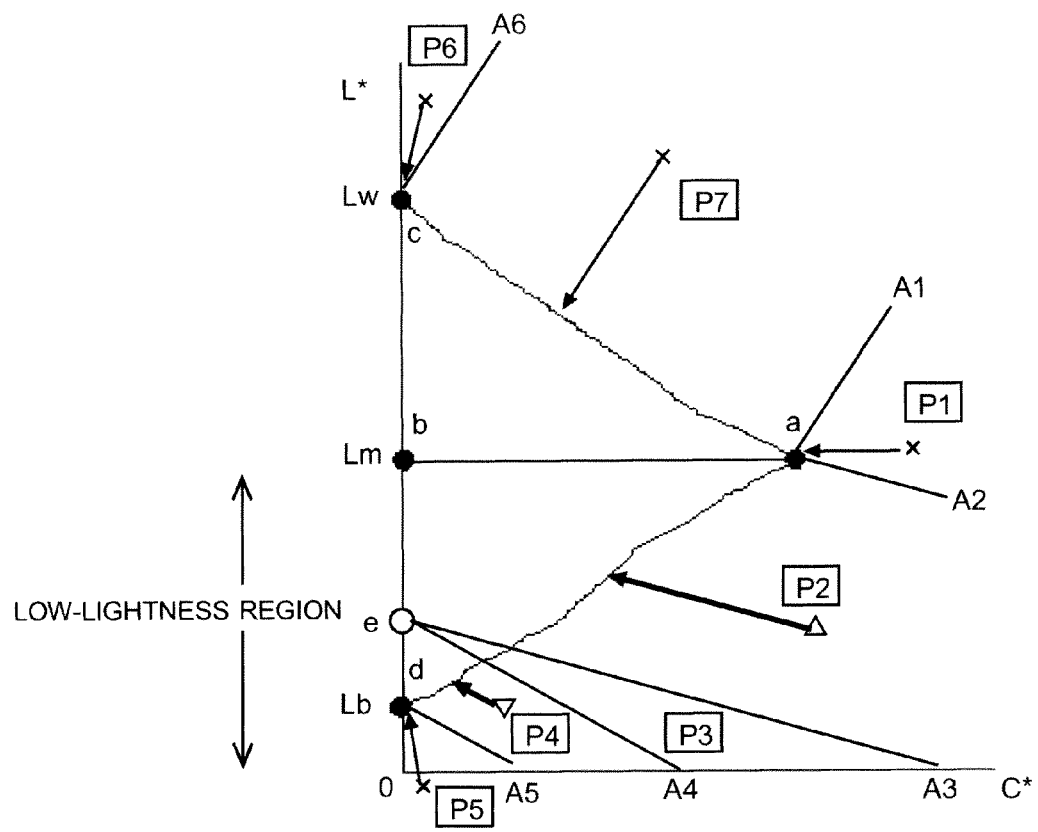
FIG. 7 is a diagram illustrating a gamut mapping (for a second color and a small limiting value of the total quantity of color material) relating to Example 1.

FIG. 6 shows an example of gamut mapping under the condition that the limiting value of the total quantity of color material (TL) for Red as the second color is great (TL=250%), and FIG. 7 shows an example of gamut mapping under the condition that the limiting value of the total quantity of color material (TL) for Red as the second color is small (TL=170%). The color of the point of maximum chroma is represented by Red 100%=Yellow 100%+Magenta 100%. Therefore, under the condition that the limiting value of the total quantity of color material (TL) is smaller than 200% as shown in FIG. 7, the color of the point of maximum chroma has a smaller chroma value than that in the condition of FIG. 6, because the color is influenced by the limiting value of the total quantity of color material. Further, as for colors located in the area extending from the point of maximum chroma to the black point (Yellow 100%+Magenta 100%+Cyan 100%+Black 100%=400%), which are colors with decreasing lightness, in other words, colors in the low-lightness region, the color-adjusting device 20 tries to reproduce the colors by replacing the values of Y, M and C into the value of K (Black) because the mapping is subject to the restriction of the total quantity of color material.

Herein, in apart of the low-chroma region at the side of the black point, the color-adjusting device 20 can reproduce the colors with replacing the values of Y, M and C into the value of K (Black) easily. However, in a part of the middle-high chroma region located near the point of maximum chroma, the colors have almost no Cyan component, and can be different colors when the values are replaced to the K value. Therefore, it is difficult to replace the values of C, M, Y into the value of K, and such the replacement can cause a unnatural color reproduction with excessively high lightness. This phenomenon occurs conspicuously under the condition that the limiting value of the total quantity of color material (TL) is lower than 200%.

To solve that, in the present example, the color-adjusting device 20 adjusts reference point e, when the limiting value of the total quantity of color material (TL) is small as shown in FIG. 7, to enlarge region P2 and much more reduce the absolute value of gamut-mapping angle S2 of region P2 (reduce the slope) by shifting the reference point e toward the lightness value of the black point Lb more than the condition that the limiting value of the total quantity of color material (TL) is large as shown in FIG. 6. Thereby, colors in the region P2 are prevented from having excessively high lightness. In this process, in order to suppress the occurrence of a tone jump and the flattening of the gradation of color reproduction in region P4, the color-adjusting device 20 defines gamut-mapping angle S2 of region P2 and gamut-mapping angle S4 of region P4 so as to satisfy the above expression (3), thereby, optimized gamut-mapping angles are defined for respective regions.

Figure 9:
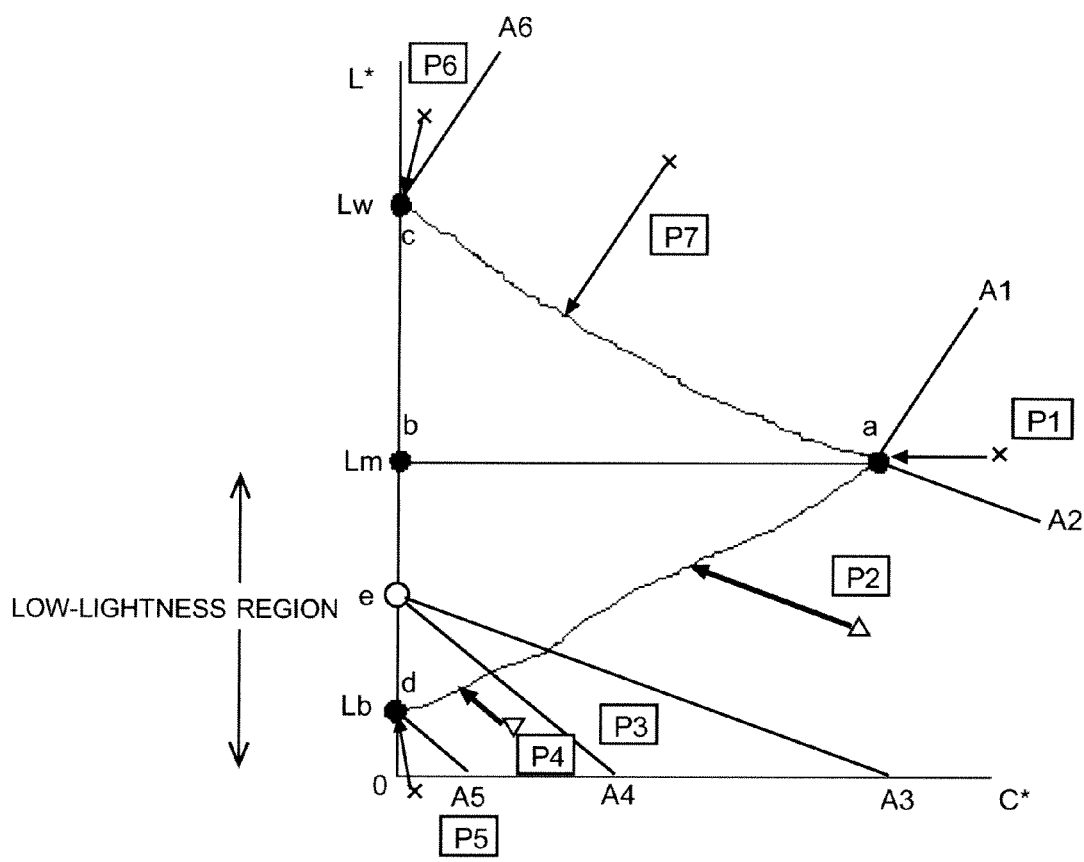
FIG. 9 is a diagram illustrating a gamut mapping (for a primary color and a small limiting value of the total quantity of color material) relating to Example 1.

FIGS. 8 and 9 show another example using a primary color. FIG. 8 shows an example of gamut mapping under the condition that the limiting value of the total quantity of color material (TL) for Magenta is great (TL=250%), and FIG. 9 shows an example of gamut mapping under the condition that the limiting value of the total quantity of color material (TL) for Magenta is small (TL=170%). Because the color of the point of maximum chroma is represented by Magenta 100%, the color is not influenced by the limiting value of the total quantity of color material even under the condition that the limiting value of the total quantity of color material (TL) of FIG. 9 is smaller than 200%. Therefore, the color of the point of maximum chroma under the condition that the limiting value of the total quantity of color material (TL) is 170% as shown in FIG. 9, has the same chroma as that under the condition that the limiting value of the total quantity of color material (TL) is 250% as shown in FIG. 8. On the other hand, colors located in the area extending from the point of maximum chroma to the black point (Yellow 100%+Magenta 100%+Cyan 100%+Black 100%=400%), which are colors with decreasing lightness, in other words, colors in the low-lightness region, the color-adjusting device 20 tries to reproduce the colors by replacing the values of Y, M and C into the value of K (Black) because the mapping is subject to the restriction of the total quantity of color material.

Herein, in apart of the low-chroma region at the side of the black point, the color-adjusting device 20 can reproduce the colors with replacing the values of Y, M and C into the value K (Black) easily. However, in a part of the middle-high chroma region located near the point of maximum chroma, the colors have almost no Yellow component and almost no Cyan component, and can be different colors when the values are replaced to the value of K value. Therefore, it is difficult to replace the values of C, M, Y into the value of K, and such the replacement can cause a unnatural color reproduction with excessively high lightness. However, the total quantity of color material in the high-chroma region is smaller than that in the situation of the second color and the influence of the limiting value of the total quantity of color material is smaller than the situation of the second color.

To solve that, in the present example, the color-adjusting device 20 adjusts reference point to much more reduce the absolute value of gamut-mapping angle S2 of region P2 (reduce the slope) by shifting the reference point toward the lightness value of the black point Lb by a smaller distance than the situation of the second color as shown in FIG. 9. Thereby, colors in the region P2 is prevented from having excessively high lightness. In this process, in order to suppress the occurrence of a tone jump and the flattening of the gradation of color reproduction in region P4, the color-adjusting device 20 defines gamut-mapping angle S2 of region P2 and gamut-mapping angle S4 of region P4 so as to satisfy the above expression (3), thereby, optimized gamut-mapping angles are defined for respective regions.

FIG. 10 shows a conventional example of gamut mapping. In the conventional example, the low-lightness region has been provided as one area including the low-chroma region and the middle-high-chroma region and only one gamut-mapping angle has been allowed to set to the region. Therefore, the color reproduction in the low-lightness region has been easily deteriorated. In contrast, in the present example, the low-lightness region is divided into two regions of the low-chroma region and the middle-high-chroma region, as described above, which allows the color-adjusting device 20 to define the gamut-mapping angle of the middle-high-chroma region to be smaller than that of the low-chroma region and enhances the color-reproduction accuracy of the low-lightness area, especially, the middle-high-chroma region.

Next, gamut mapping for an intermediate hue between the predetermined reference hues will be described with reference to FIG. 11. The predetermined reference hues are defined as the following six hues: yellow (Y), magenta (M) and Cyan (C) as primary colors; and red (R), blue (B) and green (G) as second colors. The predetermined reference hues may further include any additional hues.

FIG. 11 shows reflectivity as a function of hue angle. The hue angle of each predetermined reference hue is represented by using an open symbol. The reflectivity is assumed to be 100% at the hue angle of each of the predetermined reference hues. The reflectivities for other hue angles are previously defined according to the distance (hue-angle difference) from the hue angle of the neighboring predetermined reference hue. The color-adjusting device 20 performs gamut mapping according to the reflectivities. Hereinafter, an example of hue Q at the hue angle h=20° will be described.

The neighboring predetermined reference hues of hue Q are Magenta and Red, where the predetermined reference hue in the negative (−) hue angle direction has hue angle hm=0° and the predetermined reference hue in the positive (+) hue angle direction has hue angle hm=40°.

The distances of hue Q from the neighboring predetermined reference hues are represented by distance Δh1=20° for the predetermined reference hue of Magenta and distance Δh2=20° for the predetermined reference hue of Red.

As can be seen from the FIG. 11, the hue Q is an intermediate hue such that the predetermined reference hues on the both sides of hue Q are the primary color (Magenta) and the second color (Red) and the distances (hue-angle differences) of the hue Q from the neighboring predetermined reference hues are the same to each other.

As illustrated in FIGS. 6 to 9, a second color makes greater influence of the limiting value of the total quantity of color material to colors in the middle-high-chroma region (P2 in FIGS. 6 to 9) in the low-lightness region of the gamut, in comparison with the primary colors, under the condition that the limiting value of the total quantity of color material is small. Therefore, the color-adjusting device 20 is configured to perform gamut mapping in the middle-high-chroma region so as to make the lightness value of a primary color after the mapping lower in comparison with a second color. Therefore, as for an intermediate hue such that the predetermined reference hues on the both sides of the hue are a primary color and a second color and the distances (hue-angle distances) of the hue from the neighboring predetermined reference hues are the same to each other, as the above hue Q, the color reproduction of the low-lightness region of the hue can be enhanced by defining the reflectivity of the second color to be higher than the reflectivity of the primary color.

In the example of FIG. 11, the values of reflectivity of the predetermined reference hues neighboring hue Q are defined as 30% for the primary color of the predetermined reference hues (Magenta), and as 70% for the second color of the predetermined reference hues (Red), which are defined such that the reflectivity of the second color of the predetermined reference hues is higher than the other. Herein, mapping angle S2q of the region P2 for hue Q is calculated by the expression (4), where S2m and S2r are mapping angles of the region P2 for the primary color of the predetermined reference hues (Magenta) and the second color of the predetermined reference hues (Red).

$$S2q = S2m \times 0.3 + S2r \times 0.7 \quad (4)$$

In FIG. 11, the hues represented by the bold broken lines are the intermediate hues. One of them is defined such that the distances (hue-angle difference) of the hue Q from the neighboring predetermined reference hues are the same to each other. As for the hues other than the hue Q (hues whose neighboring predetermined reference hues are any of the combinations of Red and Yellow, Yellow and Green, Green and Cyan, Cyan and Blue, and Blue and Magenta), the reflectivity of each second color is determined to be higher than that of the corresponding primary color.

Performing the gamut mapping for the intermediate hues other than the predetermined reference hues as described above, allows the color-adjusting device to create a device profile of color image output device 30 with achieving excellent color reproduction and excellent tone characteristics for every hue.

As described above, accuracy of the color reproduction in the low-lightness region can be enhanced even when the saved color material is used, by defining a reference point to divide the low-lightness region into the middle-high-chroma region and the low-chroma region, and additionally by reducing the absolute value of the gamut-mapping angle (a slope represented by "lightness/chroma") in the middle-high-chroma region, and further changing the position of the reference point so as to extend the region wherein the absolute value of the gamut-mapping angle is small toward the low-chroma side under the condition that the limiting value of the total quantity of color material is small. For performing the mapping for an intermediate hue, when the neighboring predetermined reference hues on the both sides of the intermediate hue are a primary color and a second color and the hue-angle differences of the intermediate hue from the respective predetermined reference hues are the same to each other, the gradation characteristics can be maintained in an excellent condition by making the reflectivity of the second color of the predetermined reference hues higher than the reflectivity of the primary color of the predetermined reference hues.

Example 2

Figure 12:
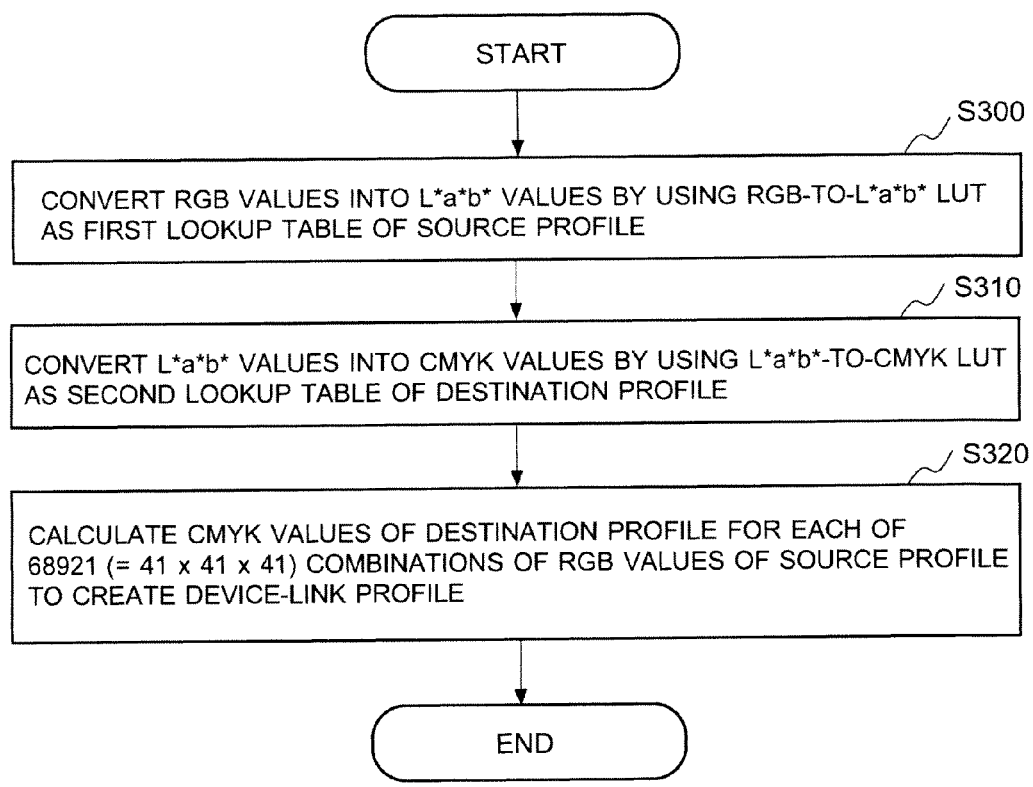
FIG. 12 is a flowchart illustrating operations of a color-adjusting device (creating a device profile in the case that input values are RGB values) relating to Example 2.

Next, a color-adjusting method and a color-adjusting program relating to Example 2 will be described with reference to FIG. 12. FIG. 12 is a flowchart illustrating the processing of the color-adjusting device of the present example.

The above-described processing of FIG. 5 in Example 1 uses the CMYK values of an offset printing press for a source profile. Alternatively, sRGB which is a generally-distributed RGB profile accompanied with color system values (one of the international standards prepared by the International Electrotechnical Commission (IEC)) can be used. Creating a device-link profile in this case will be described with reference to the flowchart of FIG. 12.

First, color-adjusting device 20 (color-adjusting program) converts RGB values into L*a*b* values by using a RGB-to-L*a*b* LUT as a first lookup table of sRGB (S300), and then, converts L*a*b* values into CMYK values by using a L*a*b*-to-CMYK LUT as a second lookup table of a device profile of color image output device 30 (S310). Then, color-adjusting device 20 calculates CMYK values of the destination profile, for example, for each of 68921 (=41×41×41) combinations of RGB values of the source profile, to create a device-link-profile (S320). After that, color-adjusting device 20 performs a color conversion of an image with applying the created device-link profile, and causes color image output device to output the resulting image.

While the present example of the present invention have been described using specific terms, such description is for illustrative purpose only, and it is to be understood that changes and variations may be made without depending from the spirit or scope of the appended claims.

For example, in the above examples, one first lookup table and one second lookup table have been prepared for a device profile of a printer. Alternatively, the color-adjusting device may perform the following processing. The color-adjusting device creates a first lookup table and a second lookup table corresponding to each of rendering intents such as a colorimetric intent, a perceptual intent and a saturation intent and stores the tables as device profiles of the printer. When one of the rendering intents is selected on a setting screen of color-adjusting device 20, the color-adjusting device uses a corresponding first lookup table and a corresponding second lookup table.

In Example 1, an offset printing press has been used as a target device. However, embodiments of the present invention can be applied to any condition that an arbitrary device (such as a printing device, a display device and a printed matter) having a different gamut from a printer to be used for output is used as a target device. In Example 2, sRGB has been used as a generally-distributed RGB profile. However, embodiments of the present invention can be applied to any condition that any other arbitrary RGB profiles which are generally-distributed are used as a source profile.

The invention claimed is:

1. A color-adjusting method to be used in a color conversion which converts colors of a first device into colors of a printer as a second device having a gamut being different from a gamut of the first device, for mapping out-gamut colors outside the gamut of the second device within the gamut of the second device in the color conversion, the method comprising:

using a processor of a device which performs the color conversion to perform:

a first step of representing the gamut of the second device on a plane defined by a lightness axis and a chroma axis at a hue in a color system, by using values obtained by color measurement of a color chart which has been outputted by the second device;

a second step of obtaining a limiting value of a total quantity of color material which determines a total quantity of color material used when the second device outputs the color chart;

a third step of dividing a region outside the gamut of the second device, based on a point of maximum chroma of the gamut of the second device and a white point and a black point of the gamut of the second device on the lightness axis, into a high-lightness region wherein lightness values are higher than a lightness value of the point of maximum of chroma and a low-lightness region wherein lightness values are lower than the lightness value of the point of maximum of chroma, and further dividing the low-lightness region, based on a reference point defined according to the limiting value of the total quantity of color material, into a low-chroma region and a medium-high-chroma region wherein chroma values of the low-chroma region are lower than chroma values of the medium-high-chroma region, the reference point being set between the lightness value of the point of maximum of chroma and a lightness value of the black point both located on the lightness axis;

a fourth step of defining a gamut-mapping angle for mapping the out-gamut colors within the gamut of the second device, for each of the high-lightness region, the low-chroma region in the low-lightness region and the medium-high-chroma region in the low-lightness region, the gamut-mapping angle being defined as "lightness/chroma"; and a fifth step of adjusting a lightness value and a chroma value of each of the out-gamut colors no as to shift the each of the out-gamut colors in the plane at the gamut-mapping angle corresponding to a region which is one of the high-lightness region, the low-chroma region and the medium-high-chroma region and includes the each of the out-gamut colors, to perform mapping the out-gamut colors within the gamut of the second device.

2. The method of claim 1,
wherein, in the fourth step, the gamut-mapping angle for the medium-high-chroma region is defined to be smaller than the gamut-mapping angle for the low-chroma region, and
wherein, in the fifth step, the mapping is performed such that lightness values of the out-gamut colors in the medium-high chroma region are changed smaller than lightness values of the out-gamut colors in the low-chroma region.

3. The method of claim 1,
wherein, in the third step, as the limiting value of the total quantity of color material becomes smaller, the reference point is shifted to be closer to the black point on the lightness axis.

4. The method of claim 1,
wherein, in the fifth step, a color of an intermediate hue defined between predetermined reference hues is mapped based on reflectivities each defined by using a hue-angle difference of a hue of the color from each of the predetermined reference hues neighboring the hue of the color, and
when the predetermined reference hues are a primary color and a second color and the hue-angle differences of the hue of the color from the respective predetermined reference hues are same to each other, a reflectivity of the second color is defined to be higher than a reflectivity of the primary color.

5. The method of claim 4, wherein the primary color is one of yellow, magenta and cyan, and the second color is one of red, blue and green.

6. The method of claim 1, wherein the first device is at least one of a printing device, a display device and a printed matter.

7. A non-transitory computer readable medium storing a color-adjusting program to be executed in a device for performing a color conversion wherein colors of a first device are converted into colors of a printer as a second device having a gamut being different from a gamut of the first device, the color-adjusting program causing a processor of the device, for mapping colors outside the gamut of the second device into the gamut of the second device, to perform the processes of:

a first process of representing the gamut of the second device on a plane defined by a lightness axis and a chroma axis at a hue in a color system, by using values obtained by color measurement of a color chart which has been outputted by the second device;

a second process of obtaining a limiting value of a total quantity of color material which determines a total quantity of color material used when the second device outputs the color chart;

a third process of dividing a region outside the gamut of the second device, based on a point of maximum chroma of the gamut of the second device and a white point and a black point of the gamut of the second device on the lightness axis, into
- a high-lightness region wherein lightness values are higher than a lightness value of the point of maximum of chroma and
- a low-lightness region wherein lightness values are lower than the lightness value of the point of maximum of chroma, and further dividing the low-lightness region, based on a reference point defined according to the limiting value of the total quantity of color material, into a low-chroma region and a medium-high-chroma region wherein chroma values of the low-chroma region are lower than chroma values of the medium-high-chroma region, the reference point being set between the lightness value of the point of maximum of chroma and a lightness value of the black point both located on the lightness axis;

a fourth process of defining a gamut-mapping angle for mapping the out-gamut colors within the gamut of the second device, for each of the high-lightness region, the low-chroma region in the low-lightness region and the medium-high-chroma region in the low-lightness region, the gamut-mapping angle being defined as "lightness/chroma"; and a fifth process of adjusting a lightness value and a chroma value of each of the out-gamut colors so as to shift the each of the out-gamut colors in the plane at the gamut-mapping angle corresponding to a region which is one of the high-lightness region, the low-chroma region and the medium-high-chroma region and includes the each of the out-gamut colors, to perform mapping the out-gamut colors within the gamut of the second device.

8. The non-transitory computer readable medium of claim 7,
wherein, in the fourth process, the gamut-mapping angle of the medium-high-chroma region is defined to be smaller than the gamut-mapping angle of the low-chroma region, and
wherein, in the fifth process, the mapping is performed such that lightness values of the out-gamut colors in the medium-high chroma region are changed smaller than lightness values of the out-gamut colors in the low-chroma region.

9. The non-transitory computer readable medium of claim 7,
wherein, in the third process, as the limiting value of the total quantity of color material becomes smaller, the reference point is shifted to be closer to the black point on the lightness axis.

10. The non-transitory computer readable medium of claim 7,
wherein, in the fifth process, a color of an intermediate hue defined between predetermined reference hues is mapped based on reflectivities each defined by using a hue-angle difference of a hue of the color from each of the predetermined reference hues neighboring the hue of the color, and
when the predetermined reference hues are a primary color and a second color and the hue-angle differences of the hue of the color from the respective predetermined reference hues are same to each other, a reflectivity of the second color is defined to be higher than a reflectivity of the primary color.

11. The non-transitory computer readable medium of claim 10, wherein the primary color is one of yellow, magenta and cyan, and the second color is one of red, blue and green.

12. The non-transitory computer readable medium of claim 7, wherein the first device is at least one of a printing device, a display device and a printed matter.

\* \* \* \* \*